March 16, 1926.
P. P. SPIEGEL
WEED PULLER
Filed Sept. 8, 1925
1,576,798
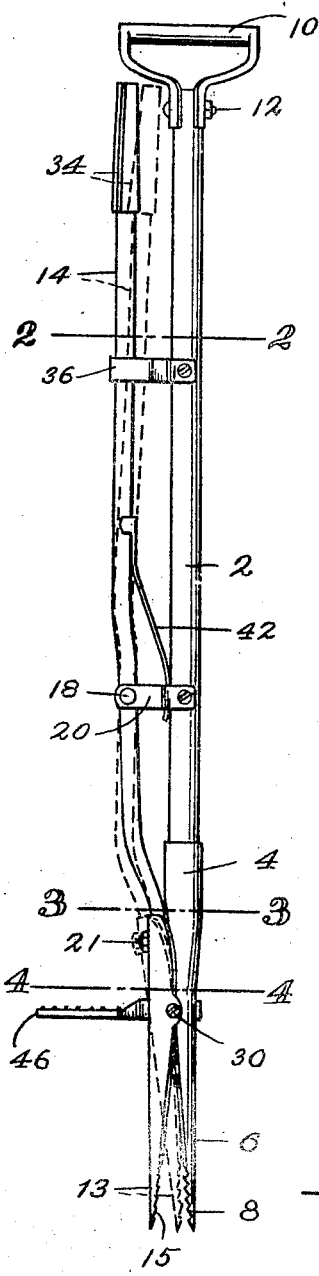
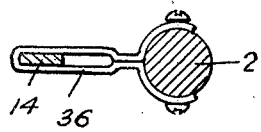
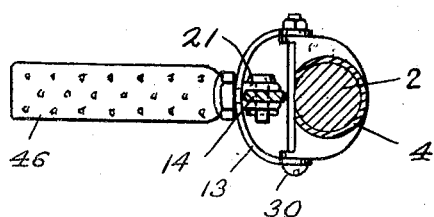
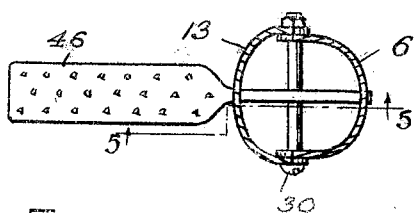
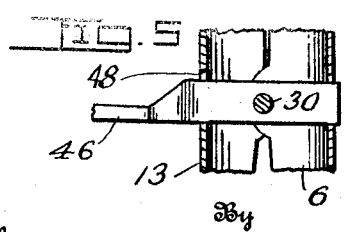
Witness:
Dred C. Fischer.
Inventor:
Peter P. Spiegel,
By F. G. Fischer,
Attorney.

Patented Mar. 16, 1926.

1,576,798

UNITED STATES PATENT OFFICE.

PETER P. SPIEGEL, OF KANSAS CITY, MISSOURI.

WEED PULLER.

Application filed September 8, 1925. Serial No. 55,030.

*To all whom it may concern:*

Be it known that I, PETER P. SPIEGEL, a citizen of the United States, residing at Kansas City, in the county of Jackson and State of Missouri, have invented certain new and useful Improvements in Weed Pullers, of which the following is a specification.

My invention relates to garden tools such as those employed in pulling weeds, etc., and one object of the invention is to provide a device of this character which will remove all or the greater portion of the roots of the weeds, and thus prevent them from quickly springing up again.

A further object is to provide a garden tool which can be operated in standing position, so that the operator will not have to assume a tiresome bending position in pulling the weeds or other vegetation.

In order that the invention may be fully understood, reference will now be had to the accompanying drawing, in which:

Fig. 1 is a side elevation of the tool.

Fig. 2 is an enlarged cross section on line 2—2 of Fig. 1.

Fig. 3 is an enlarged cross section on line 3—3 of Fig. 1.

Fig. 4 is an enlarged cross section taken on line 4—4 of Fig. 1.

Fig. 5 is an enlarged fragmentary vertical section on line 5—5 of Fig. 4.

In carrying out the invention I provide a staff 2, which is provided at its lower end with a tubular member 4, formed at its lower portion into a fixed jaw 6.

10 designates a handle fixed to the top of the staff 2, by suitable means as a nut and bolt 12, said handle being used to guide and assist in forcing the fixed jaw 6 and a movable companion jaw 13 into the ground.

14 designates a lever mounted upon a fulcrum 18, carried by a bracket 20 secured to the staff 2. Said lever 14 is pivotally connected at its lower end to a bolt 21 secured to the movable jaw 13 which is similar in construction to the fixed jaw 6 with which it cooperates. The jaws 6 and 13 taper towards their lower ends, so that they can be readily forced into the ground and said jaws are provided at their adjacent edges with serrations 8 and 15, to enable them to firmly grip the vegetation to be pulled. The movable jaw 13 is pivotally mounted upon a bolt 30 extending transversely through the fixed jaw 6. The upper end of the lever 14 is provided with a handle 34 to afford a convenient grip for the operator.

36 designates a guide fixed to the staff 2. The lever 14 extends through said guide 36 which limits the movements of said lever when it is operated to open or close the jaw 13.

42 designates a spring secured between the staff 2 and the bracket 20 and having its free end bearing against the lever 14 to normally hold said lever in position to retain the movable jaw 13 in open position.

A foot piece 46 is provided to aid in forcing the jaws 6 and 13 into the ground. Said foot piece extends through a slot 48 in the jaw 13 and an opening in the jaw 6 and is mounted upon the bolt 30. The slot 48 permits the jaw 13 to operate freely upon the bolt 30.

In practice downward pressure is applied to the handle 10 and the foot piece 46 to force the jaws 8 and 13 into the ground at the base of a weed, with the jaws spread apart as shown in full lines on Fig. 1. When the desired depth has been reached the lever 14 is pressed inwardly to the dotted line position, Fig. 1, which in turn rocks the lower end of said lever and the upper end of the movable jaw 13 outwardly, thereby causing the lower end of said jaw 13 to move towards the stationary jaw 6 and firmly grip the weed. The device is then pulled upwardly by the handle 10, which results in pulling the weed up by the roots, after which the jaw 13 is opened by the action of the spring 42 and allows the weed to fall to the ground.

Having thus described my invention, what I claim and desire to secure by Letters Patent, is:

1. A tool of the character dscribed consisting of a staff, a tubular member fixed to the lower end of said staff and terminating at its lower end in a fixed jaw, a movable jaw operably connected to said fixed jaw, and a lever for actuating said movable jaw.

2. A tool of the character described consisting of a staff, a member fixed to the lower end of said staff and embodying a fixed jaw, a movable jaw operably connected to said fixed jaw, a lever for actuating said movable jaw, and a bracket secured to the staff and to which said lever is fulcrumed.

3. A tool of the character described consisting of a staff, a member secured to the lower end of said staff and embodying a fixed jaw, a movable jaw operably connected to said fixed jaw, a hand lever for actuating said movable jaw, a bracket secured to the staff and upon which the hand lever is pivotally mounted, and spring means interposed between said hand lever and the staff.

4. A tool of the character described consisting of a staff, a tubular member secured to the lower end of said staff and embodying a fixed jaw, a movable jaw operably connected to said fixed jaw, a lever for actuating said movable jaw, and a foot piece secured to the fixed jaw.

5. A tool of the character described consisting of a staff provided at its upper end with a handle, a member secured to the lower portion of said staff and embodying a fixed jaw, a movable jaw operably connected to said fixed jaw, a hand lever for actuating said movable jaw, and a guide secured to the staff and through which said lever operably extends.

6. A tool of the character described consisting of a staff provided at its upper end with a handle, a tubular member secured to the lower portion of said staff and embodying a downwardly tapered fixed jaw having serrations, a downwardly tapered movable jaw provided with serrations, a pivot connecting said jaws, a lever pivotally connected to the upper portion of the movable jaw, and spring means for normally holding said lever in position to hold the movable jaw in open position.

In testimony whereof I affix my signature.

PETER P. SPIEGEL.